US012568894B1

(12) United States Patent
Gao et al.

(10) Patent No.: US 12,568,894 B1
(45) Date of Patent: Mar. 10, 2026

(54) CULTIVATION METHOD OF KONJAC UNDER NON-CHEMICAL SIMULATED ENVIRONMENT

(71) Applicant: Xichang University, Xichang (CN)

(72) Inventors: Zhiqiang Gao, Tangshan (CN); Jing Li, Xichang (CN); Mingxian Lan, Liangshan (CN); Ying Yuan, Xichang (CN); Hong Chen, Luzhou (CN)

(73) Assignee: Xichang University, Xichang (CN)

( * ) Notice: Subject to any disclaimer, the term of this patent is extended or adjusted under 35 U.S.C. 154(b) by 30 days.

(21) Appl. No.: 18/922,445

(22) Filed: Oct. 22, 2024

(30) Foreign Application Priority Data

Sep. 10, 2024 (CN) .......................... 202411261107.1

(51) Int. Cl.
| | |
|---|---|
| *A01G 22/15* | (2018.01) |
| *A01C 21/00* | (2006.01) |
| *A01G 22/25* | (2018.01) |
| *A01M 21/00* | (2006.01) |

(52) U.S. Cl.
CPC .............. *A01G 22/15* (2018.02); *A01C 21/00* (2013.01); *A01G 22/25* (2018.02); *A01M 21/00* (2013.01)

(58) Field of Classification Search
CPC ........ A01G 22/25; A01G 22/15; A01C 21/00; A01M 21/00
See application file for complete search history.

(56) References Cited

U.S. PATENT DOCUMENTS

2014/0087944 A1* 3/2014 Habib .................... A01N 43/16
                                               504/117
2016/0050915 A1* 2/2016 Demares ................ A01N 47/00
                                               424/93.1
2016/0270407 A1* 9/2016 Kellar .................... A01N 63/30

FOREIGN PATENT DOCUMENTS

CN      109418098 A * 3/2019 ........... A01C 21/005
CN      112021119 A * 12/2020 ............. A01N 37/46

OTHER PUBLICATIONS

Dora Nurshanti et al., "Planting Materials, Shading Effects, and Non-Destructive Estimation of Compound Leaf Area in Konjac (*Amorphophallus muelleri*)", Aug. 17, 2021, Trends in Sciences 2022, 19(9): 3973 (Year: 2021).*

* cited by examiner

*Primary Examiner* — Joshua J Michener
*Assistant Examiner* — Nicole Paige Maccrate

(57) ABSTRACT

A cultivation method of konjac under non-chemical simulated environment includes: (1), site selection: a forest land with a shade degree in a range of 30% to 90% and a slope of 0° to 30° is selected, roots 1.5 to 2.0 meters away from a tree trunk are plowed and broken, followed by fertilizing, and forming ridges for planting; (2), planning: a planting depth of konjac seed corms is 3 to 5 times a height of the konjac seed corms, then a *Penicillium glabrum* agent is applied; (3), weed and pest control: after the planting, a planting bed of the ridges is covered; once konjac seedlings are grown, a complex solution containing *Penicillium glabrum* is applied every month, after half a month of the applying the complex solution, Qingkulike, matrine, and azadirachtin are applied; (4), fertilization: after the konjac seed corms enter a swelling period, a high-potassium organic fertilizer is applied.

8 Claims, 1 Drawing Sheet

CULTIVATION METHOD OF KONJAC UNDER NON-CHEMICAL SIMULATED ENVIRONMENT

TECHNICAL FIELD

The disclosure relates to the technical field of konjac cultivation, and particularly to a cultivation method of konjac under non-chemical simulated environment.

BACKGROUND

Konjac, also known as *Amorphophallus*, is a perennial herbaceous plant belonging to the Araceae family and the *Amorphophallus* genus. It is mainly distributed in Asia and Africa, and in China, it is primarily found in the Qinba mountain area, the mountainous area surrounding the Sichuan Basin, the Yunnan-Guizhou Plateau, the mountainous areas of Nanling and Lingnan, southern Yunnan, and Taiwan. China is a major producer and the earliest country to utilize konjac, with records of konjac cultivation dating back more than 1700 years. However, scientific cultivation techniques and processing utilization of konjac in China began in the 1980s. Konjac is a food low in calories, protein, and vitamins but high in dietary fiber. High dietary fiber, that is, konjac glucomannan (KGM), is its effective nutritional component. In the medical and health care fields, KGM can help reduce blood lipids, regulate sugar metabolism, improve large intestine function, and aid in weight loss and slimming.

Konjac is native to warm, humid, and shady habitats, with its ancestral species being residents of the forest understory. It grows best in temperatures ranging from 15° C. to 30° C. (with an optimal temperature of 25° C.), air humidity ranging from 80% to 90%, soil moisture content ranging from 70% to 80% of the field capacity, and shade degrees ranging from 30% to 90% (with diffuse light conditions being most suitable). The development of China's konjac industry began in the 1980s, with cultivation methods evolving from the traditional practice of digging up large tubers and leaving small ones for "natural growth cultivation" to annually planting rhizomes to prevent winter frost damage and issues with continuous cropping. Driven by market development and price incentives, large-scale planting of konjac in China has become increasingly common. However, due to the relatively short period of cultivation and domestication, there are still bottleneck issues in the industry's development, such as long breeding cycles, low reproduction rates, severe diseases, and continuous cropping obstacles. Disease problems, in particular, can easily lead to significant crop reduction or even total crop failure during large-scale planting. Moreover, the quality of konjac in large-scale artificial planting processes is significantly lower than that of naturally grown konjac. The majority of konjac cultivation still follows the high-yield agricultural model, which needs to be considered carefully. Crop varieties have been genetically modified over thousands of years to adapt to high-yield models, whereas the research and development of konjac varieties have not accumulated enough to support large-scale high-yield models, creating significant challenges in konjac production.

SUMMARY

The main purpose of the disclosure is to provide a cultivation method of konjac under non-chemical simulated environment, thereby solving the existing problems.

In order to achieve above purpose, the technical solutions are as follows.

A cultivation method of konjac under non-chemical simulated environment includes steps as follows:

step (1), site selecting: selecting a forest land with a shade degree in a range of 30% to 90% and a slope in a range of 0° to 30°, plowing and breaking roots 1.5 to 2.0 meters away from a tree trunk, followed by fertilizing, and forming ridges for planting;

step (2), planting, wherein a planting depth of konjac seed corms is 3 to 5 times a height of the konjac seed corms; after the planting, the *Penicillium glabrum* microorganism agent should be mixed with about 50 to 100 kilograms of organic fertilizer or mature farm manure at a rate in a range of 2.5 to 10 kilograms per mu, followed by spreading on the edge of the konjac seed corms, and then covered with soil.

step (3), weed and pest controlling: after the planting, covering a planting bed of the ridges with a layer of straw or dead branches and leaves; once the konjac seed corms are grown to be konjac seedlings, applying a complex solution of *Penicillium glabrum* and *Bacillus subtilis* every month, after half a month of the applying the complex solution of *Penicillium glabrum* and *Bacillus subtilis*, applying Qingkulike, matrine, and azadirachtin; and step (4), fertilizing: after the konjac enters a swelling period, applying a high-potassium organic fertilizer.

Based on the above technical solutions, the disclosure has the following technical effects. the konjac has developed its own unique lifestyle in the long process of adapting to various habitats. The disclosure proposes a wild-ecology-based konjac cultivation method, which adopts the ecological concept of following a natural way to create a non-chemical simulated cultivation technology for konjac that balances yield, quality, and disease resistance. It is of great significance for the healthy development of the konjac industry's ecological chain.

1. The disclosure does not use or directly apply chemical fertilizers throughout the entire process. It integrates agricultural production techniques and models that advocate, demonstrate, and promote straw returning to the field and the utilization of understory space. 2. For both base fertilizer and top-dressing of biological organic fertilizers, compound microbial fertilizers, and organic-inorganic mixed fertilizers (with chemical fertilizers added in proportion before fermentation and mixed) containing organic matter and beneficial bacteria are used to replace pure chemical fertilizers. 3. No chemical pesticides or herbicides are used throughout the process; instead, biological pesticides are employed. Based on the enhancement of crop disease resistance by the biological organic fertilizers, the non-chemical pesticides such as beneficial bacteria displacement technology, plant-derived pesticides, animal-derived pesticides, and mineral-derived pesticides are used to combat pests and diseases, achieving limited control of field pests and diseases. 4. The disclosure proposes for the first time the simulated cultivation of konjac, with the site selection that fully restores the original warm, humid, and shady forest understory habitat of konjac. 5. The disclosure utilizes *Penicillium glabrum* microbial agents, which significantly improve the disease resistance and yield of konjac.

BRIEF DESCRIPTION OF DRAWINGS

In order to more clearly illustrate the technical solutions of embodiments of the disclosure or the existing techniques, a brief introduction will be given to the drawings used in the embodiments. It is evident that the attached drawings are merely some embodiments of the disclosure. For those skilled in the art, without the need for creative effort, other drawings can also be obtained based on the attached drawings.

DETAILED DESCRIPTION OF EMBODIMENTS

Figure 1:
FIG. 1 illustrates intercropping of konjac in a natural forest.
Figure 2:
FIG. 2 illustrates intercropping of the konjac in a walnut forest.

Various exemplary embodiments of the disclosure are now described in detail, which should not be construed as limiting the disclosure, but rather as a more detailed description of certain aspects, features, and embodiments of the disclosure.

It should be understood that the terms used in the disclosure are merely for describing specific embodiments and are not intended to limit the disclosure. Additionally, for the numerical ranges in the disclosure, it should be understood that every intermediate value between the upper and lower limits of the disclosed range is also specifically included. Any intermediate value within any stated value or range, as well as any smaller range between any other stated values or intermediate values within the range, is also included in the disclosure. The upper and lower limits of these smaller ranges may be independently included or excluded from the range.

Unless otherwise specified, all technical and scientific terms used herein have the same meanings as understood by those skilled in the art of the disclosure. Although the disclosure describes preferred methods and materials, any methods and materials that are similar or equivalent to those described herein may also be used in the practice or testing of the disclosure. All references mentioned in this specification are incorporated by reference to disclose and describe the methods and/or materials related to those references. In the event of any conflict with any incorporated references, the content of this specification shall prevail.

Without departing from the scope or spirit of the disclosure, a variety of modifications and variations to the specific embodiments described in this specification are apparent to those skilled in the art. Other embodiments that would be obvious to those skilled in the art are also apparent from the description of the disclosure. The specification and the embodiments provided are exemplary only.

Regarding the terms "include", "have", "contain", and "involve", used in the disclosure, they are all open-ended terms, meaning that they include but are not limited to.

The technical solutions described in the disclosure, unless otherwise specified, are conventional solutions in this field. The reagents or raw materials used, unless otherwise specified, are purchased from commercial channels or have been disclosed.

Specifically, a cultivation method of konjac under non-chemical simulated environment includes steps as follows:

step (1), site selection: a forest land with a shade degree in a range of 30% to 90% and a slope in a range of 0° to 30° is selected, roots 1.5 to 2.0 meters away from a tree trunk are plowed and broken, followed by fertilizing, and forming ridges for planting;

step (2), a planting depth of konjac seed corms is 3 to 5 times a height of the konjac seed corms;

step (3), weed and pest control: after the planting, a planting bed of the ridges is covered with a layer of straw or dead branches and leaves; once the konjac seed corms are grown to be konjac seedlings, a complex solution of *Penicillium glabrum* and *Bacillus subtilis* is applied every month, after half a month of the applying the complex solution of *Penicillium glabrum* and *Bacillus subtilis*, Qingkulike, matrine, and azadirachtin are applied;

step (4), fertilization: after the konjac seed corms enter a swelling period, a high-potassium organic fertilizer is applied.

In an embodiment, the forest land includes a natural forest, an artificial forest or a fruit forest, soil of the non-chemical environment is loamy sand or light loam, with a potential of hydrogen (pH) in a range of 6.0 to 7.5.

In an embodiment, konjac can be planted under natural forests, plantations, locust trees, chestnuts, walnuts, berberis, plums, peaches, apples, cherries, kiwifruit trellises, and other fruit forests with the shade degree of about 60%.

In an embodiment, a depth of the plowing and the breaking roots is 40 to 60 centimeters (cm), and the fertilizing in the step (1) includes: applying 2000 kilograms of mature farm manure per mu and 1000 kilograms of commercial organic fertilizer per mu.

In an embodiment, the forming ridges for planting includes: a furrow width in a range of 30 to 50 cm and a ridge height in a range of 25 to 45 cm.

In an embodiment, on the forest land with the slope of 15° to 30°, it is also possible not to form ridges. When planting, the soil from the furrows can be directly spread over the planting beds to form a ridge.

In an embodiment, the konjac seed corms are first-generation seeds (cormlets or rhizomes) or second-generation seeds. For planting and harvesting in the same year, choose the second-generation seeds, for planting in the first year and harvesting in the second year, choose the first-generation seeds. The konjac seed corms should have shallow buds, no injuries, no disease spots, be smooth, and have plump buds. A weight of each of second-generation seeds is in a range of 50 to 500 grams, preferably in a range of 100 to 200 grams. Before the planting, the seeds should be selected, graded, and sown in categories for easy management. The seeds should be dried for 5 to 7 days, sprinkled with 2 to 3% quicklime or wood ash, and then spread out for storage.

In an embodiment, a planting depth of konjac seed corms is 3 to 5 times a height of the konjac seed corms, but the planting depth of konjac seed corms should not be shallower than 8 to 10 cm. In addition, the *Penicillium glabrum* microorganism agent should be mixed with about 50 to 100 kilograms of organic fertilizer or mature farm manure at a rate in a range of 2.5 to 10 kilograms per mu, spread on the edge of the konjac seed corms, and then covered with the soil.

In an embodiment, a thickness of the layer of straw or dead branches and leaves is in a range of 8 to 10 cm.

In an embodiment, a concentration of the complex solution of *Penicillium glabrum* and *Bacillus subtilis* is 200 million per milliliter, with a ratio of *Penicillium glabrum* to *Bacillus subtilis* of 3:2; an application rate (also referred to as applying amount) of the complex solution is in a range of 500 to 1000 milliliters per mu.

In an embodiment, an active ingredient content of a berberine in the Qingkulike is 0.5%, with an application rate in a range of 200 to 500 milliliters per mu; an active ingredient content in the matrine is 0.5%, with a concentration of 600 to 800 times in the matrine, and an application rate in a range of 50 to 150 milliliters per mu; the active ingredient content in the azadirachtin is 1.0%, with an application rate in a range of 60 to 150 milliliters per mu.

In an embodiment, if soft rot or white mold occurs locally, quicklime powder or multi-element disinfectant powder is immediately applied on the infected plants and the soil around the base to control the spread. An amount of the quicklime or the multi-element disinfectant powder is in a range of 15 to 40 grams per plant.

In an embodiment, the high-potassium organic fertilizer includes one of humic acid potassium organic fertilizer, fulvic acid potassium organic fertilizer, and seaweed organic potassium fertilizer; an application rate of the high-potassium organic fertilizer is 20 to 40 kilograms per mu.

In an embodiment, the cultivation method further includes a step of harvesting. A sunny day is chosen for digging, and a spike-tooth harrow (also referred to as nail rake) is used for excavation, or oxen plowing is combined with manual or mechanical excavation and manual work, so as to harvest fresh konjac (also referred to as Konjac tuber). Commercial fresh konjac seed corms and the fresh konjac seed corms are dried on the planting bed until the soil falls off. The commercial fresh konjac is sold directly, and the fresh konjac is sun-dried on the spot. The fresh konjac is stored after they have lost about 30% of their moisture.

In an embodiment, the commercial organic fertilizer (pure fermented bio-organic fertilizer, containing organic matter ≥65%) is purchased from Gennado Biotechnology Co., Ltd.

In an embodiment, *Penicillium glabrum* is purchased from Liangshan State Gefu Biotechnology Co., Ltd., and *Bacillus subtilis* is purchased from Liangshan State Gefu Biotechnology Co., Ltd.

Embodiment 1

The cultivation method of konjac in a natural forest simulated environment includes steps as follows.

Step (1), site selection: the natural forest (formed by natural and artificial promotion of natural regeneration or initiation) with a shade degree of 44% is selected, with a slope of 20°, sheltered from the wind, deep soil layer, high content of humus, loose texture, and rich in organic matter loamy sand soil. A pH of the soil in the selected natural forest is 6.2.

Step (2), land preparation: firstly, at a position 1.5 meters away from the tree trunk, the roots are mechanically plowed and broken with a depth of 40 cm. Then, 2000 kilograms of mature farm manure and 40 kilograms of compound fertilizer [15-15-15, also referred to as 15-15-15 NPK fertilizer, i.e., a type of chemical fertilizer containing equal proportions of nitrogen (N), phosphorus ($P_2O_5$), and potassium ($K_2O$), with each active ingredient comprising 15% of the formula, totaling 45% of active ingredients] per mu are decomposed to obtain a decomposed and mixed fertilizer, then the decomposed and mixed fertilizer is evenly spread with 1000 kg/mu of commercial organic fertilizer on the soil surface, followed by rotary tillage, and then ridges are formed for planting.

Step (3), forming ridges for planting: the ridges are formed at a width of 1 meter, with a furrow width of 30 cm and a ridge height of 25 cm, the planting is started after forming the ridges.

Step (4), seed selection: first-generation seeds with shallow buds, no injuries, no disease spots, smooth skin, and plump buds are selected. The first-generation seeds are sun-dried for 5 days, sprinkled with 2% quicklime or wood ash, and followed by spreading them out for storage.

Step (5), planting: the seed corms are placed with bud eyes facing up, at an approximate angle on the planting beds. The planting depth should be 3 times the height of the seed corms according to the size of the seed corms, but not shallower than 8 cm. In addition, the *Penicillium glabrum* microorganism agent should be mixed with about 50 kilograms of organic fertilizer at a rate of 2.5 kilograms per mu, spread on the edges of the seed corms, and then covered with the soil.

Step (6), weed control: after the planting, the surface of the planning beds (also referred to as the ridge surface) is covered with a layer of mulch 8 to 10 cm thick, such as wheat, rice, corn straw, pine needles, or dead branches and fallen leaves from the natural forest, etc.

Step (7), pest and disease control: after the konjac seedlings are established, a complex solution of *Penicillium glabrum* and *Bacillus subtilis* (concentration of 200 million per milliliter, with a living bacteria count ratio of the *Penicillium glabrum* to the *Bacillus subtilis* of 3:2) is applied once every month at a dosage of 500 milliliters per mu to prevent the soft rot and infectious diseases. Simultaneously, biological agents such as Qingkulike (with an active ingredient berberine content of 0.5%, 200 milliliters per mu), matrine 600 times liquid (with an active ingredient content of 0.5%, 50 milliliters per mu), and azadirachtin (with an active ingredient content of 1.0%, 60 milliliters per mu) are applied after half a month of applying the complex solution, to prevent *sclerotium* disease (also referred to as white hypha disease) or leaf blight. If local soft rot or white mold occurs, do not dig or disturb the soil, immediately use an adequate amount of quicklime powder, sprinkle it on the infected plants and the soil around the base, with a dosage of 15 grams per plant to control the spread.

Step (8), fertilization: after the konjac enter a swelling period, 20 kilograms per mu of humic acid potassium organic fertilizer as topdressing are applied.

Step (9), harvesting: a sunny day is chosen for digging, and a spike-tooth harrow (also referred to as nail rake) is used for excavation, or oxen plowing is combined with manual or mechanical excavation and manual work, so as to harvest fresh konjac (also referred to as Konjac tuber). Commercial fresh konjac and the fresh konjac are dried on the planting bed until the soil falls off. The commercial fresh konjac is sold directly, and the fresh konjac is sun-dried on the spot. The fresh konjac is stored after they have lost about 30% of their moisture.

Embodiment 2

The cultivation method of konjac in a walnut forest simulated environment includes steps as follows.

Step (1), site selection: the walnut forest with a shade degree of 43% is selected, with a slope of 18°, sheltered from the wind, deep soil layer, high content of humus, loose texture, and rich in organic matter loamy sand soil. A pH of the soil in the selected walnut forest is 6.5.

Step (2), land preparation: firstly, at a position 1.5 meters away from the tree trunk, the roots are mechanically plowed and broken with a depth of 60 cm. Then, 2000 kilograms of mature farm manure and 40 kilograms of compound fertilizer per mu are decomposed to obtain a decomposed and mixed fertilizer, then the decomposed and mixed fertilizer is evenly spread with 1000 kg/mu of commercial organic fertilizer on the soil surface, followed by rotary tillage, and then ridges are formed for planting.

Step (3), forming ridges for planting: the ridges are formed at a width of 1.5 meters, with a furrow width of 50 cm and a ridge height of 45 cm, the planting is started after forming the ridges.

Step (4), seed selection: first-generation konjac rhizomes, with shallow buds, no injuries, no disease spots, smooth skin, and plump buds are selected. The first-generation konjac rhizomes are sun-dried for 7 days, sprinkled with 3% quicklime or wood ash, and followed by spreading them out for storage.

Step (5), planting: the seed corms are placed with the bud eye facing up, at an approximate angle on the planting beds. The planting depth should be 5 times the height of the seed corms according to the size of the seed corms, but not shallower than 8 cm. In addition, the *Penicillium glabrum* microorganism agent should be mixed with about 100 kilograms of organic fertilizer or farm manure at a rate of 10 kilograms per mu, spread on the edge of the seed corms, and then covered with the soil.

Step (6), weed control: after the planting, the surface of the planning beds is covered with a layer of mulch 8 to 10 cm thick, such as wheat, rice, corn straw, pine needles, or dead branches and fallen leaves from the natural forest, etc.

Step (7), pest and disease control: after the konjac seedlings are established, a complex solution of *Penicillium glabrum* and *Bacillus subtilis* (concentration of 200 million per milliliter, with a living bacteria count ratio of the *Penicillium glabrum* to the *Bacillus subtilis* of 3:2) is applied once every month at a dosage of 1000 milliliters per mu to prevent the soft rot and infectious diseases. Simultaneously, biological agents such as Qingkulike (with an active ingredient berberine content of 0.5%, 500 milliliters per mu), matrine 800 times liquid (with an active ingredient content of 0.5%, 50 milliliters per mu), and azadirachtin (with an active ingredient content of 1.0%, 150 milliliters per mu) are applied after half a month of applying the complex solution, to prevent white mold or leaf blight diseases. If local soft rot or white mold occurs, do not dig or disturb the soil, immediately use an adequate amount of quicklime powder, sprinkle it on the infected plants and the soil around the base, with a dosage of 40 grams per plant to control the spread.

Step (8), fertilization: after the konjac seed corms enter a swelling period, 40 kilograms per mu of fulvic acid potassium organic fertilizer as topdressing are applied.

Step (9), harvesting: a sunny day is chosen for digging, and a spike-tooth harrow is used for excavation, or oxen plowing is combined with manual or mechanical excavation and manual work, so as to harvest fresh konjac (also referred to as Konjac tuber). Commercial fresh konjac and the fresh konjac are dried on the planting bed until the soil falls off. The commercial fresh konjac is sold directly, and the fresh konjac is sun-dried on the spot. The fresh konjac is stored after they have lost about 30% of their moisture.

Embodiment 3

The cultivation method of konjac in a cherry grove simulated environment includes steps as follows.

Step (1), site selection: the cherry grove with a shade degree of 30% is selected, with a slope of 12°, sheltered from the wind, deep soil layer, high content of humus, loose texture, and rich in organic matter loamy sand soil. A pH of the soil in the selected walnut forest is 6.6.

Step (2), land preparation: firstly, at a position 1.5 meters away from the tree trunk, the roots are mechanically plowed and broken with a depth of 40 cm. Then, 2000 kilograms of mature farm manure and 40 kilograms of compound fertilizer per mu are decomposed to obtain a decomposed and mixed fertilizer, then the decomposed and mixed fertilizer is evenly spread with 1000 kg/mu of commercial organic fertilizer on the soil surface, followed by rotary tillage, and then ridges are formed for planting.

Step (3), forming ridges for planting: the ridges are formed at a width of 1 meter, with a furrow width of 30 cm and a ridge height of 25 cm, the planting is started after forming the ridges.

Step (4), seed Selection: the second-generation seeds are selected for planting, which can be harvested in the same year they are sown. The konjac seed should have shallow buds, no injuries, no disease spots, smooth skin, and plump buds. Each second-generation seed should weigh between 100 to 200 grams. Before planting the konjac seed, they should be selected, graded, and sown by category for easier management. The konjac seeds are sun-dried for 5 days, sprinkled with 3% quicklime or wood ash, and then spread them out for storage.

Step (5), planting: the seed corms are placed with the bud eye facing up, at an approximate angle on the planting beds. The planting depth should be 3 times the height of the seed corms according to the size of the seed corms, but not shallower than 8 cm. In addition, the *Penicillium glabrum* microorganism agent should be mixed with about 50 kilograms of organic fertilizer or farm manure at a rate of 2.5 kilograms per mu, spread on the edge of the seed corms, and then covered with the soil.

Step (6), weed control: after the planting, the surface of the planning beds is covered with a layer of mulch 8 to 10 cm thick, such as wheat, rice, corn straw, pine needles, or dead branches and fallen leaves from the natural forest, etc.

Step (7), pest and disease control: after the konjac seedlings are established, a complex solution of *Penicillium glabrum* and *Bacillus subtilis* (concentration of 200 million per milliliter, with a living bacteria count ratio of the *Penicillium glabrum* to the *Bacillus subtilis* of 3:2) is applied once every month at a dosage of 500 milliliters per mu to prevent the soft rot and infectious diseases. Simultaneously, biological agents such as Qingkulike (with an active ingredient berberine content of 0.5%, 200 milliliters per mu), matrine 600 times liquid (with an active ingredient content of 0.5%, 80 milliliters per mu), and azadirachtin (with an active ingredient content of 1.0%, 60 milliliters per mu) are applied after half a month of applying the complex solution, to prevent white mold or leaf blight diseases. If local soft rot or white mold occurs, do not dig or disturb the soil, immediately use an adequate amount of quicklime powder, sprinkle it on the infected plants and the soil around the base, with a dosage of 20 grams per plant to control the spread.

Step (8), fertilization: after the konjac seed corms enter a swelling period, 30 kilograms per mu of seaweed organic potassium fertilizer as topdressing are applied.

Step (9), harvesting: a sunny day is chosen for digging, and a spike-tooth harrow is used for excavation, or oxen plowing is combined with manual or mechanical excavation and manual work, so as to harvest fresh konjac (also referred to as Konjac tuber). Commercial fresh konjac and the fresh konjac are dried on the planting bed until the soil falls off. The commercial fresh konjac is sold directly, and the fresh konjac is sun-dried on the spot. The fresh konjac is stored after they have lost about 30% of their moisture.

Embodiment 4

The cultivation method of konjac in an apple grove simulated environment includes steps as follows.

Step (1), site selection: the apple grove with a shade degree of 30% is selected, with a slope of 10°, sheltered from the wind, deep soil layer, high content of humus, loose texture, and rich in organic matter loamy sand soil. A pH of the soil in the selected walnut forest is 6.4.

Step (2), land preparation: firstly, at a position 1.5 meters away from the tree trunk, the roots are mechanically plowed and broken with a depth of 40 cm. Then, 2000 kilograms of mature farm manure and 40 kilograms of compound fertilizer per mu are decomposed to obtain a decomposed and mixed fertilizer, then the decomposed and mixed fertilizer is evenly spread with 1000 kg/mu of commercial organic fertilizer on the soil surface, followed by rotary tillage, and then ridges are formed for planting.

Step (3), forming ridges for planting: the ridges are formed at a width of 1 meter, with a furrow width of 30 cm and a ridge height of 25 cm, the planting is started after forming the ridges.

Step (4), seed Selection: the second-generation seeds are selected for planting, which can be harvested in the same year they are sown. The konjac seed should have shallow buds, no injuries, no disease spots, smooth skin, and plump buds. Each second-generation seed should weigh between 100 to 200 grams. Before planting the konjac seed, they should be selected, graded, and sown by category for easier management. The konjac seeds are sun-dried for 5 days, sprinkled with 3% quicklime or wood ash, and then spread them out for storage.

Step (5), planting: the seed corms are placed with the bud eye facing up, at an approximate angle on the planting beds. The planting depth should be 3 times the height of the seed corms according to the size of the seed corms, but not shallower than 8 cm. In addition, the *Penicillium glabrum* microorganism agent should be mixed with about 50 kilograms of organic fertilizer or farm manure at a rate of 2.5 kilograms per mu, spread on the edge of the seed corms, and then covered with the soil.

Step (6), weed control: after the planting, the surface of the planning beds is covered with a layer of mulch 8 to 10 cm thick, such as wheat, rice, corn straw, pine needles, or dead branches and fallen leaves from the natural forest, etc.

Step (7), pest and disease control: after the konjac seedlings are established, a complex solution of *Penicillium glabrum* and *Bacillus subtilis* (concentration of 200 million per milliliter, with a living bacteria count ratio of the *Penicillium glabrum* to the *Bacillus subtilis* of 3:2) is applied once every month at a dosage of 500 milliliters per mu to prevent the soft rot and infectious diseases. Simultaneously, biological agents such as Qingkulike (with an active ingredient berberine content of 0.5%, 200 milliliters per mu), matrine 600 times liquid (with an active ingredient content of 0.5%, 50 milliliters per mu), and azadirachtin (with an active ingredient content of 1.0%, 60 milliliters per mu) are applied after half a month of applying the complex solution, to prevent white mold or leaf blight diseases. If local soft rot or white mold occurs, do not dig or disturb the soil, immediately use an adequate amount of quicklime powder, sprinkle it on the infected plants and the soil around the base, with a dosage of 30 grams per plant to control the spread.

Step (8), fertilization: after the konjac seed corms enter a swelling period, 20 kilograms per mu of humic acid potassium organic fertilizer as topdressing are applied.

Step (9), harvesting: a sunny day is chosen for digging, and a spike-tooth harrow is used for excavation, or oxen plowing is combined with manual or mechanical excavation and manual work, so as to harvest fresh konjac (also referred to as Konjac tuber). Commercial fresh konjac and the fresh konjac are dried on the planting bed until the soil falls off.

The commercial fresh konjac is sold directly, and the fresh konjac is sun-dried on the spot. The fresh konjac is stored after they have lost about 30% of their moisture.

Comparative Example 1

The method of conventional clean-cultivation of konjac includes steps as follows.

Step (1), site selection: the site selection is primarily focused on sandy loam soil with deep layers, high humus content, loose texture, and rich in organic matter, with a slope of 5°; the soil pH is 6.5.

Step (2), land preparation: 2000 kilograms of mature farm manure and 40 kilograms of compound fertilizer per mu are decomposed to obtain a decomposed and mixed fertilizer, then the decomposed and mixed fertilizer is evenly spread with 1000 kg/mu of commercial organic fertilizer over the soil surface of the site selection, followed by rotary tillage, and then ridges are formed for planting.

Step (3), forming ridges for planting: the ridges are formed at a width of 1 meter, with a furrow width of 30 cm and a ridge height of 25 cm, the planting is started after forming the ridges.

Step (4), seed selection: first-generation seeds with shallow buds, no injuries, no disease spots, smooth skin, and plump buds are selected. The first-generation seeds are sun-dried for 5 days, sprinkled with 2% quicklime or wood ash, and followed by spreading them out for storage.

Step (5), planting: the seed corms are placed with the bud eye facing up, at an approximate angle on the planting beds. The planting depth should be 3 times the height of the seed corms according to the size of the seed corms, but not shallower than 8 cm.

Step (6), weed control: After the planting, a single dose of acetochlor as a pre-emergence herbicide is applied.

Step (7), pest and disease control: after the konjac seedlings are established, mancozeb is sprayed to protect against diseases. Simultaneously, thifluzamide is applied to prevent white rot and leaf blight. If soft rot or white rot occurs in localized areas, do not dig up the soil, a sufficient amount of quicklime powder is immediately applied on the affected plants and the soil around the base, using 15 grams to control the spread.

Step (8), fertilization: after the konjac seed corms enter a swelling period, 20 kilograms per mu of monopotassium phosphate as topdressing are applied.

Step (9), harvesting: a sunny day is chosen for digging, a pick or a plow is used with manual or mechanical digging combined with human labor. Commercial fresh konjac and the fresh konjac are dried on the planting bed until the soil falls off. The commercial fresh konjac are sold directly, and the fresh konjac are sun-dried on the spot, and then graded, and transported back or sold in baskets or mesh bags. The fresh konjac are continued to dry for a period, and store them after they have lost about 30% of their moisture.

Comparative Example 2

A method of intercropping konjac with corn includes steps as follows.

Step (1), site selection: the site selection is primarily focused on sandy loam soil with deep layers, high humus content, loose texture, and rich in organic matter, with a slope of 5°; the soil pH is 6.3.

Step (2), land preparation: 2000 kilograms of mature farm manure and 40 kilograms of compound fertilizer per mu are decomposed to obtain a decomposed and mixed fertilizer, then the decomposed and mixed fertilizer is evenly spread with 1000 kg/mu of commercial organic fertilizer over the soil surface of the site selection, followed by rotary tillage, and then ridges are formed for planting.

Step (3), forming ridges for planting: the ridges are formed at a width of 1 meter, with a furrow width of 30 cm and a ridge height of 25 cm, the planting is started after forming the ridges.

Step (4), seed selection: first-generation seeds with shallow buds, no injuries, no disease spots, smooth skin, and plump buds are selected. The first-generation seeds are sun-dried for 5 days, sprinkled with 2% quicklime or wood ash, and followed by spreading them out for storage.

Step (5), planting: the seed corms are placed with the bud eye facing up, at an approximate angle on the planting beds. The planting depth should be 3 times the height of the seed corms according to the size of the seed corms, but not shallower than 8 cm. For intercropping with corn, corn seeds are sown in the furrows with a plant spacing of 40 cm, and each hole is spot-sown with 4 seeds, after which 2 plants are left after they have all germinated uniformly.

Step (6), weed control: After the planting, a single dose of acetochlor as a pre-emergence herbicide is applied.

Step (7), pest and disease control: after the konjac seedlings are established, mancozeb is sprayed to protect against diseases. Simultaneously, thifluzamide is applied to prevent white rot and leaf blight. If soft rot or white rot occurs in localized areas, do not dig up the soil, a sufficient amount of quicklime powder is immediately applied on the affected plants and the soil around the base, using 15 grams to control the spread.

Step (8), fertilization: after the konjac seed corms enter a swelling period, 20 kilograms per mu of monopotassium phosphate as topdressing are applied.

Step (9), harvesting: a sunny day is chosen for digging, a pick or a plow is used with manual or mechanical digging combined with human labor. Commercial fresh konjac and the fresh konjac are dried on the planting bed until the soil falls off. The commercial fresh konjac are sold directly, and the fresh konjac are sun-dried on the spot, and then graded, and transported back or sold in baskets or mesh bags. The fresh konjac are continued to dry for a period, and store them after they have lost about 30% of their moisture.

The yield, disease situation, and konjac quality results of cultivated konjac in Embodiment 1-4 and Comparative Examples 1-2 are shown in Tables 1 and 2.

TABLE 1

Yield and disease occurrence of
konjac under different cultivation models

| Treatment | Total yield (kg/mu) | Com-mercial konjac (kg/mu) | Seed corms of konjac (kg/mu) | Mor-bidity (%) | Disease index |
|---|---|---|---|---|---|
| clean-cultivation | 875 | 668 | 207 | 54.32 | 26.33 |
| intercropping konjac with corn | 928 | 722 | 206 | 35.22 | 23.67 |
| cultivation under a natural forest stimulated environment | 1256 | 1048 | 208 | 10.33 | 7.34 |
| cultivation under a walnut forest stimulated environment | 1058 | 887 | 171 | 18.45 | 9.55 |

TABLE 1-continued

Yield and disease occurrence of
konjac under different cultivation models

| Treatment | Total yield (kg/mu) | Com-mercial konjac (kg/mu) | Seed corms of konjac (kg/mu) | Mor-bidity (%) | Disease index |
|---|---|---|---|---|---|
| cultivation under a cherry grove stimulated environment | 1225 | 1059 | 166 | 11.86 | 7.89 |
| cultivation under an apple grove stimulated environment | 1057 | 868 | 189 | 16.12 | 8.42 |

TABLE 2

Quality characteristics of konjac
under different cultivation models

| Treatment | Soluble-sugar (%) | Protein (%) | Starch (%) | Vis-cosity (mPa · s) | Konjac gluco-mannan (%) |
|---|---|---|---|---|---|
| clean-cultivation | 5.57 | 6.03 | 10.45 | 14547 | 62.34 |
| intercropping konjac with corn | 5.46 | 6.59 | 10.83 | 14569 | 63.22 |
| cultivation under the natural forest stimulated environment | 7.13 | 7.33 | 11.17 | 16785 | 67.76 |
| cultivation under the walnut forest stimulated environment | 6.44 | 7.67 | 10.99 | 16982 | 67.34 |
| cultivation under the cherry grove stimulated environment | 7.23 | 7.21 | 11.27 | 17543 | 68.54 |
| cultivation under the apple grove stimulated environment | 6.66 | 7.15 | 10.96 | 16812 | 66.87 |

As shown in Table 1, under different cultivation models, the yield traits and disease occurrence of the konjac are affected. At present, under conventional monoculture conditions (clean-cultivation), due to the extensive use of chemical pesticides and fertilizers, as well as the impact of cultivation environment adaptability, the disease incidence and disease index of konjac are as high as 54.32% and 26.33. The intercropping konjac with corn increases the shade for konjac growth, reducing the disease incidence and disease index to 35.22% and 23.67. Under the non-chemical simulated environment cultivation technology model, the incidence and disease index of the konjac are significantly reduced to 10.33%-18.45% and 7.34-9.55, which is a decrease of 35.87%-43.99% and 16.78-18.99 units compared to conventional monoculture. The significant reduction in disease incidence and disease index has obviously increased the yield of the konjac. Under the chemical simulated environment cultivation technology model, the total yield of konjac has been increased by an average of 274 kilograms/mu and 221 kilograms/mu compared to conventional monoculture and konjac-corn intercropping models, respectively. The yield of commercial konjac has been increased by an average of 297.5 kilograms/mu and 243.5 kilograms/mu compared to conventional monoculture and the intercropping konjac with corn models, respectively. At a market price of 5 yuan/kg, this results in an average direct increase in revenue of 1370 yuan and 1105 yuan per mu.

As shown in Table 2, the quality characteristics of the konjac under different cultivation models are presented. It is evident that under the non-chemical simulated environment cultivation technology model, various quality indicators of konjac have been improved to different extents. Particularly, the viscosity and konjac glucomannan content, which are decisive indicators of konjac quality, have seen significant improvements. The viscosity has increased by an average of 17.07% compared to conventional monoculture and 16.90% compared to the konjac-corn intercropping model. The konjac glucomannan content has increased by an average of 8.48% compared to conventional monoculture and 6.97% compared to the konjac-corn intercropping model. The results fully demonstrate that the non-chemical simulated environment cultivation conditions can significantly improve the quality of the konjac, enhancing its application and market value.

According to the "Bulletin of the Main Data of the Third National Land Survey" and the results of the ninth national forest resource inventory, China currently has 4.26 billion mu of forest land and 3.3 billion mu of forest area, including 1.86 billion mu of ecological public welfare forests and 1.44 billion mu of commercial forests. The abundant forest land resources provide a broad space for the development of the forest economy industry. At the same time, China is deeply implementing a series of major national strategies such as rural revitalization, innovation-driven development, and coordinated regional development, covering key areas and key links such as ecological civilization construction, green rich people's industry, prosperity of regional economy, and consolidation and expansion of the results of poverty alleviation. The forest economy is required to develop intensively and efficiently, improve the quality of the supply system, and play an important role in promoting the formation of a new development pattern dominated by domestic circulation and mutually promoted by domestic and international dual circulation. The non-chemical simulated environment cultivation technology fully utilizes the land space through a three-dimensional green agricultural cultivation model, and can directly increase the income by an average of 5745 yuan per mu of land on the basis of the original economic fruit forest and natural forest. This technology can not only significantly improve the actual income of farmers, but also alleviate the contradiction between China's land shortage and economic development by constructing the most suitable growth conditions for konjac through habitat coupling.

Apparently, the above embodiments of the disclosure are only for the purpose of clearly illustrating the embodiments of the disclosure, and not for limiting the embodiments of the disclosure. For those skilled in the art, other forms of changes or modifications can be made based on the above explanation. It is not necessary and impossible to exhaustively list all implementation methods here. Any modifications, equivalent substitutions, and improvements made within the spirit and principles of the disclosure shall be included within the scope of protection of the claims of the disclosure.

What is claimed is:

1. A cultivation method of konjac under non-chemical simulated environment, comprising:

step (1), site selecting: selecting a forest land with a shade degree in a range of 30% to 90% and a slope in a range of 0° to 30°, plowing and breaking roots 1.5 to 2.0 meters away from a tree trunk, followed by fertilizing, and forming ridges for planting;

step (2), planting, wherein a planting depth of konjac seed corms is 3 to 5 times a height of the konjac seed corms;

step (3), weed and pest controlling: after the planting, covering a planting bed of the ridges with a layer of straw or dead branches and leaves; once the konjac seed corms are grown to be konjac seedlings, applying a complex solution of *Penicillium glabrum* and *Bacillus subtilis* every month, after half a month of the applying the complex solution of *Penicillium glabrum* and *Bacillus subtilis*, applying Qingkulike, matrine, and azadirachtin; and step (4), fertilizing: after the konjac enters a swelling period, applying a high-potassium organic fertilizer.

2. The cultivation method of the konjac under non-chemical simulated environment as claimed in claim 1, wherein the forest land comprises a natural forest, an artificial forest or a fruit forest, soil of the non-chemical environment is loamy sand or light loam, with a potential of hydrogen (pH) in a range of 6.0 to 7.5.

3. The cultivation method of the konjac under non-chemical simulated environment as claimed in claim 1, wherein a depth of the plowing and the breaking roots is 40 to 60 centimeters (cm); the fertilizing in the step (1) comprises: applying 2000 kilograms of manure per mu and 1000 kilograms of organic fertilizer per mu.

4. The cultivation method of the konjac under non-chemical simulated environment as claimed in claim 1, wherein the forming ridges for planting comprises: a furrow width in a range of 30 to 50 cm and a ridge height in a range of 25 to 45 cm.

5. The cultivation method of the konjac under non-chemical simulated environment as claimed in claim 1, wherein a thickness of the layer of straw or dead branches and leaves is in a range of 8 to 10 cm.

6. The cultivation method of the konjac under non-chemical simulated environment as claimed in claim 1, wherein a concentration of the complex solution of *Penicillium glabrum* and *Bacillus subtilis* is 200 million per milliliter, with a ratio of the *Penicillium glabrum* to the *Bacillus subtilis* of 3:2; an application rate of the complex solution is in a range of 500 to 1000 milliliters per mu.

7. The cultivation method of the konjac under non-chemical simulated environment as claimed in claim 1, wherein an active ingredient content of an berberine in the Qingkulike is 0.5%, with an application rate in a range of 200 to 500 milliliters per mu; an active ingredient content in the matrine is 0.5%, with a concentration of 600 to 800 times liquid, and an application rate in a range of 50 to 150 milliliters per mu; an active ingredient content in the azadirachtin is 1.0%, with an application rate in a range of 60 to 150 milliliters per mu.

8. The cultivation method of the konjac under non-chemical simulated environment as claimed in claim 1, wherein the high-potassium organic fertilizer comprises one of humic acid potassium organic fertilizer, fulvic acid potassium organic fertilizer, and seaweed organic potassium fertilizer; and an application rate of the high-potassium organic fertilizer is 20 to 40 kilograms per mu.

* * * * *